Nov. 3, 1964   I. RISMONDO   3,155,483
APPARATUS FOR POLISHING GLASS
Filed Oct. 5, 1959   2 Sheets-Sheet 1

INVENTOR.
IVO RISMONDO
BY Bauer and Seymour
ATTORNEYS

Nov. 3, 1964    I. RISMONDO    3,155,483
APPARATUS FOR POLISHING GLASS
Filed Oct. 5, 1959    2 Sheets-Sheet 2
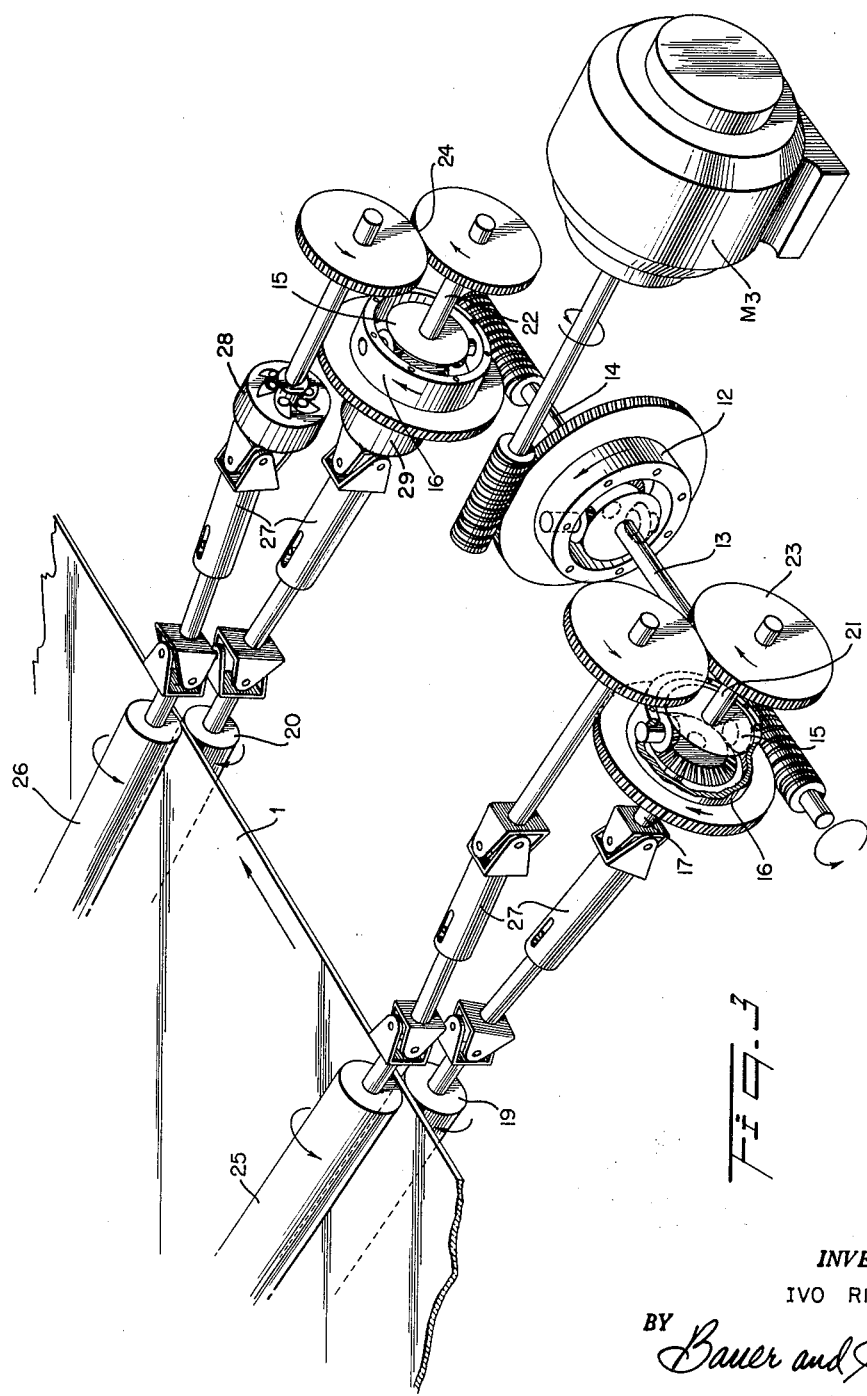
INVENTOR.
IVO RISMONDO
BY Bauer and Seymour
ATTORNEYS

United States Patent Office 3,155,483
Patented Nov. 3, 1964

3,155,483
APPARATUS FOR POLISHING GLASS
Ivo Rismondo, La-Varenne-Saint-Hilaire, France, assignor to Compagnie de Saint-Gobain, Paris, France
Filed Oct. 5, 1959, Ser. No. 844,368
Claims priority, application France Oct. 7, 1958
19 Claims. (Cl. 65—163)

This invention relates to a method of and apparatus for the continuous manufacture of glass in a polished state.

The manufacture of glass sheets or plates in accordance with the present invention consists in producing from the molten glass issuing from a melting furnace, by rolling a band of glass in continuous form, in leading the band of glass through an annealing oven or lehr wherein it is cooled progressively, and then in continuously, simultaneously grinding and polishing the two faces of the band. The grinding and polishing is performed by an apparatus having upper and lower grinding tools in the first portion thereof and glass polishing tools in the latter portion thereof, so that the two faces of the band are simultaneously finished.

In this type of flat glass manufacture, travel of the band of glass is produced by the rotation of pairs of rollers that grip it. Such driving rollers may, however, be replaced by other devices serving the same purpose; that which is to be said concerning the rollers applies equally well to other elements which serve the same glass driving and conveying purposes.

A plurality of motors are employed to turn the glass driving rollers. The inventor has observed that the speed of the band of glass depends not only upon the speed of rotation of the conveying rollers or their equivalent, but also upon other factors such as the contraction of the glass during the course of its cooling, the wearing of the rollers with the consequent change in their peripheral speed, and the braking of the glass band produced by the frictional engagement between the glass and the grinding and polishing tools. The values of all such forces and factors operating upon the glass vary constantly, so that the glass is driven at any instant with a speed which is not perfectly predetermined. As a consequence, in the glass manufacturing apparatus as a whole certain of the glass driving rollers or equivalent devices drive the band of glass at a speed equal to the peripheral speed of such devices but other devices slip upon the surface of the band of glass.

These difficulties present little if any practical inconvenience in installations wherein relatively small pressures are employed between the glass grinding and polishing tools and the glass, and wherein a relatively low speed of travel of the glass band is employed. In installations, however, of high output capacity or those wherein the pressure of the tools on a glass is high, or wherein the relative speeds of travel of the glass relative to the tools are high, such difficulties become pronounced. In such cases a fortuitous variation in the braking exercised by the tools upon the glass band, caused, for example, by a change in the pressure of the tools upon the glass, by a change in the rate of feeding of the abrasive, or the temporary withdrawal of one or more tools from the glass band during their repair or replacement, may suddenly throw out of balance the system of forces to which the glass band is subjected. Such sudden unbalances of forces may be high enough in some cases to break the glass in its solidified portion, and to produce elongation, other distortions, or even folds in the part of the glass band which is still malleable.

In accordance with the present invention, the various forces imposed upon the glass by the grinding and polishing tools and by the conveying devices such as the driving rollers and the like, which are alternated with the tools, are so correlated as to prevent any such damage to the glass band. According to the present invention each tool, or group of tools, is preferably located between two successive glass conveying devices, and the control of one of the latter is produced in such manner that its glass band driving force continuously balances the braking force imposed upon the glass by the tool associated with it.

Under such conditions no disturbance is interposed into the progression of the glass band as a result of the braking imposed by the tools, no matter what may be the total value of, and what may be the variations in, such braking. This follows from the fact that the braking force which each glass tool exerts upon the glass band is at each instant balanced by the action of the associated conveying device situated in the immediate vicinity of the tool.

As a matter of practice such equilibrium of forces can not be exact. It is, then, advantageous to provide in each combination of a tool, or group of tools, and a glass band conveying device a small difference, which is systematically in the same sense or direction, between the driving force and the braking force exerted on the band. It is thus possible, and this constitutes another object of the present invention, to resist, in the manner to be shown hereinafter, the efforts arising from defects in the compensation between the action of the tools and those of the driving elements.

For example, if in each association of a tool and a driving element the driving force produced by the driving element is slightly greater than that of the braking force, there can be located upstream of the whole of the combinations of tool or tools and driving device one or several pairs of rollers engaging the glass band and exerting upon it a retarding force equal and opposite to the sum of the systematic preponderances established downstream in favor of the forces of traction.

Conversely if the excess of forces in the combination of tool or tools and conveying device is in favor of the braking forces, the sum of such systematic preponderances may be compensated by means of a traction device located downstream of the whole of said combinations of working tool or tools and conveying device.

If any event, in accordance with the invention, the one or more pairs of pressure rollers, or other equivalent conveying means playing the same role of compensator of the differences between braking and driving, will impose upon the band of glass a speed which is correlated with the speed of rolling and with the speed of travel of the glass in the annealing lehr.

The present invention will be described with reference to the illustrative, non-limiting, examples shown in the drawings in which:

FIG. 3 is a somewhat schematic view of an embodiment of apparatus for compensating for the differences between the conveying and braking forces.

Figure 1:
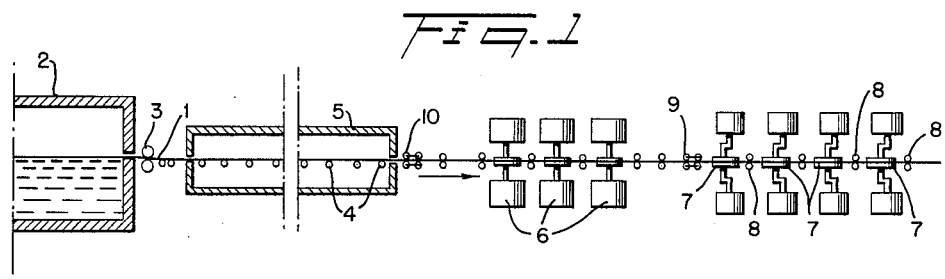
FIG. 1 is a schematic view in elevation of an installation for the continuous manufacture of polished glass.

In FIG. 1 the band of glass 1 leaves the glass melting furnace 2 and is rolled between opposed cylindrical rollers 3. The glass band is conveyed by rollers or pairs of rollers 4 of known type successively within the annealing lehr 5, and then through the continuous grinding apparatus 6 which operates simultaneously upon both broad surfaces of the glass band. In apparatus 6, the pressure between the tools and the glass is relatively small, being on the order of 15 kg./dm.$^2$ of the grinding surface. After traveling through grinding apparatus 6, the glass band travels through a series of polishing devices having polishing tools 7 of known type, which may be rectangular in section, disposed perpendicularly to the axis of the band of glass and driven with a circular translatory movement of very high frequency and small amplitude, as described in United States Patent No. 2,787,100. The polishing pressure is on the order of 50 kg./dm.$^2$ of the polishing surface.

To overcome the difficulties which may result from the high pressure of the polishing and from the great speed of the glass with respect to the polishing tools, there is associated, according to the present invention, with each pair of polishing tool 7 a glass band conveying device 8. Device 8 is disposed downstream of the pair of polishing tools under consideration and is made up by one or more pairs of rollers. In the apparatus shown there is employed one pair of rollers engaging the glass band and subjecting it to a traction at least equal to or slightly greater than the braking force exerted upon the glass band by the polishing devices 7 located immediately upstream of the conveying rollers under consideration.

At the entry end of the polishing apparatus shown in FIG. 1 there is disposed a compensating device 9. Device 9 is made up of rollers which engage the glass band with such pressure that the rollers do not slip upon the band, the rollers being rotatably driven in such manner that their speed has a constant predetermined value which is not affected by the tractive force which is transmitted to it from downstream, from the right as shown in FIG. 1, by the band of glass.

With the method it is the speed and not the torque which is imposed upon the rollers. The braking torque thus generated is, by virtue of the principle of the equality of action and reaction, automatically equal to, but of opposite sense from, the torque which is generated by the traction exerted by the band of glass.

Such a manner of driving may be carried out in a known manner by means of a synchronous motor with frequency control, or with a motor which is controlled by feed-back. It is known that control by feed-back consists in the intervention of a cybernetic means function of the speed acting on a controlling factor of such speed. The speed of displacement imposed upon the band of glass 1 by the conveying device 9 is chosen to bear a predetermined relationship to the speed of rolling, taking into account the contraction of the glass due to its cooling in the lehr 5.

The installation may include, at the exit end of the lehr 5, and this constitutes another object of the present invention, a speed regulating device 10 similar to device 9. Thus device 10 is adapted to impose a predetermined speed upon the band of glass, but always with this difference: that the speed chosen is slightly less than that of device 9 and that the rollers of device 10 are driven by a free wheeling device which permits the rollers 10, under normal conditions, to be driven by the band of glass. The free-wheeling device is preferably chosen to be of that type which has a "dead" or inoperative course, between the idle, free wheeling range and the driven range, which is very small and is preferably zero.

Under such conditions, in case the band of glass in the run thereof between devices 9 and 10 should break or fracture, the portion of the band located upstream of the break receives from the device 10 a speed of travel slightly less than the speed which had initially been imposed upon it by the device 9. The fracture is thus enlarged so as to limit the damage occasioned by the fracture. Thus at the moment when the break occurs in the glass band, there is no stop period in the travel of the portion of the band of glass driven by the device 10. Consequently, there is no formation of swellings or folds in the soft glass entering the lehr 5.

One can as well adopt an inverted construction, by providing the rollers of the device 9 with a free wheeling device, and driving the glass band at a speed imposed by the rollers of device 10. In this case it is the rollers of device 10 which brake the traction efforts imposed upon the band of glass by the polishing apparatus, and the considerable length of glass between the device 10 and the polishing apparatus 7, under normal operation, operates to attenuate the vibrations which may be superposed upon the tractive efforts to which the band of glass is subjected. In case of breakage of the band of glass occuring between devices 9 and 10, the device 9 then takes over the function of device 10 in its role of regulating the speed of the band of glass.

According to another embodiment it is possible to associate the drive rollers 9 with a free-wheeling device which permits the braking, at a given speed, of the traction effort exercised by the whole of the driving means acting on the glass under the tools, while retarding the driving of the glass ribbon by the rollers 9, while the other driving rollers 10, similarly equipped with a free-wheeling device to provide for the driving of the rollers 10 by the glass ribbon, the rollers 10 being turned at a speed slightly less than the speed of the rollers 9 so that in case of rupture of the glass band between the two sets of rollers, rollers 10 drive the upstream part of the glass band at lower speed than the speed of the downstream part of the glass band.

The force exercised by a driving device 8 may easily be automatically correlated with the braking force imparted to the glass band by the associated polishing tool 7. It has been observed by the inventor that the braking effort exerted by the tool is proportional at the same time to the rubbing force which it imposes on the glass, and to the relation between the speed of displacement of the tool and that of the glass. It therefore suffices to drive the device 8 by a motor which is automatically adjusted to the indications of a tachometer $T_2$ which registers the speed of travel of the band of glass, the speed of the tool being practically constant, and to the indications of apparatus which register the energy applied by the polishing tool to the glass, or to another value which is proportional to the power consumed by the motors of the polishing tool, or to the product of the pressure of the tool against the glass multiplied by its coefficient of friction.

The drive for each conveying means 8 is thus carried out so that a determined value of tractive effort is exerted by the driving rollers upon the glass, while the control of the conveying devices 9 and 10 is arranged to impose a conveying speed which is practically not influenced by the conveying forces.

Figure 2:
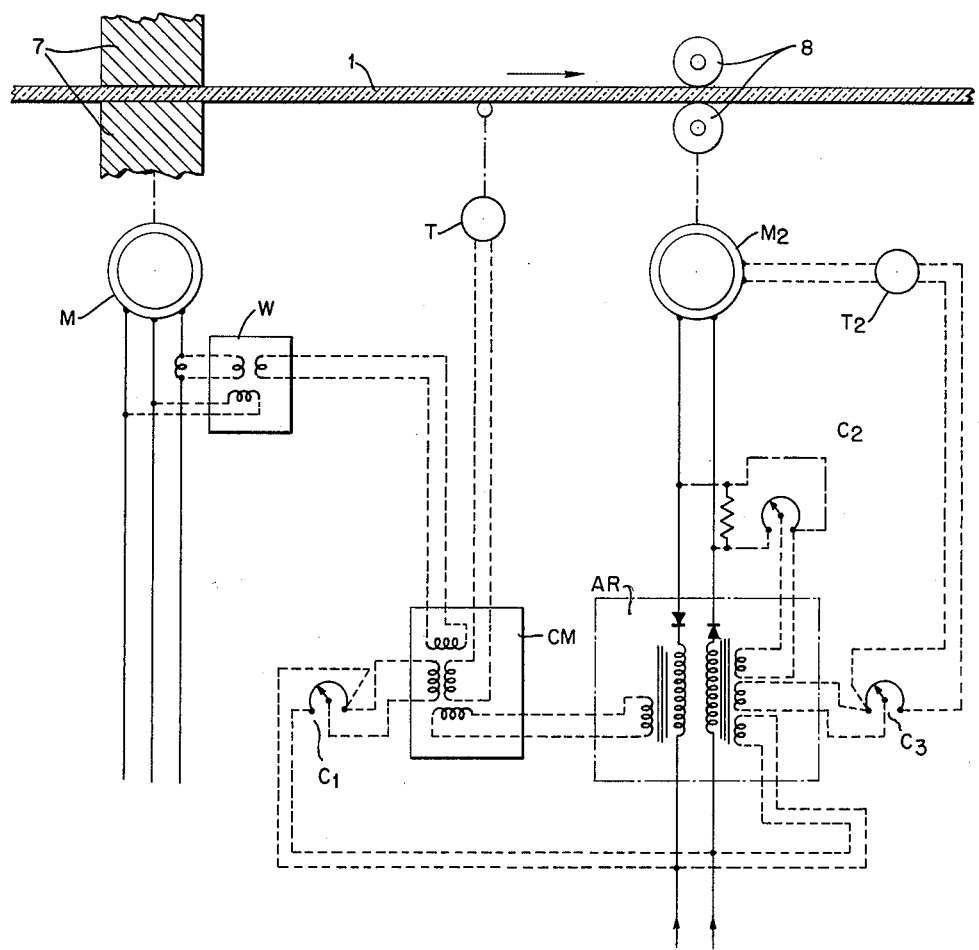
FIG. 2 is the wiring diagram of a particular embodiment of apparatus for correlating the braking and conveying forces imposed upon the glass band, and for compensating for the differences existing therebetween.

The rotation of the drive rollers may be assured by one or several motors $M_2$ fed by a network as shown in FIG. 2 including devices or machines which act either on the voltage, on the current intensity, or on the frequency, or on two or more of such factors or variables. The apparatus for so doing may comprise a converter device, a Ward Leonard device, a transducer, or a thyratron. Such apparatus constitutes a servo mechanism which supplies power to the motors in such manner as to adjust their torque as a function of the braking force exercised by the polishing tools upon the glass.

The friction exercised by the polisher 7 on the glass is proportional on one hand to the work of polishing and on the other hand to the relative speeds of the glass and the tools or, when the speed of the tools is constant, to the speed of the glass. The controlling mechanism of the invention includes several pieces of apparatus each of which has its own function. The apparatus AR is a transducer, a term which means a magnetic amplifier, and this controls the supply of power which is delivered to the motor $M_2$ which drives the rollers 8. The couple furnished by the motor $M_2$ to the rollers 8 is automatically regulated by the magnetic amplifier AR as a function of the signals of command and control which it receives in its auxiliary coils.

The measuring converter CM generates the signal which controls the magnetic amplifier AM by combining the signals delivered by detecting apparatus T and W. Apparatus W is of watt meter type which delivers to CM a signal proportional to the power which is drawn by the polishing motor M and it is therefore proportional to the work of polishing. The apparatus T is a dynamo tachometer driven by contact with the glass which delivers to CM a signal proportional to the speed of displacement of the glass ribbon.

The converter CM combines the product of the signals furnished by the two apparatus W and T and projects a signal to magnetic amplifier AR which is proportional to the two signals supplied by W and T and this signal is applied to the principal control coil of AR. The control circuits can be manually regulated by potentiometers $C_1$ and $C_2$ which constitutes means for limiting the couple which is supplied on one hand by the apparatus T and on the other by the tachometer $T_2$ driven by the motor $M_2$. The control circuit which is regulated by the potentiometer $C_2$ is the circuit of reaction proper to all servomechanisms. It is supplied from the outgoing signal of the magnetic amplifier AR.

Thus, from its principle of construction, the amplifier AR controls the couple supplied by the motor $M_2$, and therefore the couple furnished by the rollers 8 in a manner proportional to the command signal which it receives and which is itself proportional on the one hand to the work of polishing and on the other to the speed of advancement of the glass.

When, as above described, the rollers 8 are comprised of several pairs it is necessary to distribute the driving couples of the different rollers so that they are equally divided.

The expression measuring converter has already been commercially used for apparatus which have the object of transforming one signal into another.

One form of the apparatus will be described by reference to FIG. 2. The regulating apparatus there shown is made up of a transducer fed by the network. Such apparatus includes as a part thereof a driving winding and as another part, several windings serving to control and to correct the speed of driving. It is known that the braking force exercised by the polishing tool 7 on the glass is proportional both to the work of the polishing and to the relation between the speeds of travel of the glass and of the tool, or when the speed of the tool is constant, to the speed of advancement of the glass. There is disposed upon the principal motors M which drive the polishing tools a wattmeter element W which delivers to a measuring converter CM a signal proportional to the polishing power, a tachometer T, driven at the speed of the glass, delivers to CM a signal proportional to such speed, and the resultant of the two signals is sent from apparatus CM, to roller drive control apparatus AR.

The measuring converter CM has one coil which receives a feedback signal $C_1$ from AR and it delivers a control signal to the control circuit of the control apparatus AR. The control apparatus AR, as shown, also receives a voltage signal $C_2$ from the power line to the roller drive motor $M_2$ and a speed signal $C_3$ from the motor $M_2$ and tachometer $T_2$ of rollers 8. The apparatus AR, therefore, serves to control the current which is fed to the motor $M_2$. In case where, as described above, the devices 8, 9 and 10 are made up of an assembly of rollers, the driving torques of the different rollers of each set is so distributed that the torques are equalized between them.

The inventor has observed that in the case of a rigid mechanical connection between the rollers, a small difference in the characteristics of the individual rollers, such as variation in diameter, the hardness of their covering rubber layers, etc., results in inequalities of driving speed which are cumulative in time. In other words, the peripheral speeds of the rollers differ and there is considerable inequality between the torques transmitted to each roller. The rollers whose torque decreases thus participate less and less in the work of driving which is demanded of them, while those whose torque increases eventually slip upon the glass when their driving effort exceeds the limit of adherence. To overcome this last difficulty, the equality of torques may be assured by one or more mechanical differentials connected in cascade. Such an embodiment is shown in FIG. 3.

In FIG. 3 there is shown a driving motor $M_3$ which drives through a mechanical differential 12 of known type, for example, that used in the rear axle of automobiles. Each of the driven axles 13 and 14 of differentials 12 is drivingly connected to a further differential 15 and 16, respectively. One of the driven shafts 17 and 18 is connected to rollers 19 and 20. The other driven shafts 21 and 22 of differentials 15 and 16 are connected by reverse gears 23 and 24 with the rollers 25 and 26 associated with rollers 19 and 20, respectively. Each of the driving trains to rollers 19, 25, and 20, 26, includes a sliding key connection and two universal joints of the constant angular speed type. Overrunning clutches 28, 29 provide free wheeling for their respective driving rollers.

The rollers may also be driven by individual motors of the variable speed type, and the equality of the torques is then obtained by the identity of the motors and their identical manners of feeding, in which case inequalities of speed do not have a cumulative effect. There may be also applied to each roller a torque-limiting device with a sliding torque adjustable during operation of the device to maintain a state of sliding by the systematic application of over speed to the driving train.

The differences between the torques may be attenuated, but not nullified, by the provision of very resilient rubber coatings upon the rollers, such coating being especially resistant to heat. Such coatings may be, for example, silicone rubbers which would be applied to the rollers of device 10 in FIG. 1. It is of interest to place the device 10 as upstream as possible near to the issue of lehr 5. Accordingly at the location of rollers 10, the glass is still at high temperature as it issues from the lehr 5 so it is necessary that the coating of the rollers being markedly heat resistant.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. In apparatus for continuously manufacturing polished flat glass which comprises a plurality of driving means engaging the glass which tend to impart constant motion thereto, opposed surface working tools, engaging opposite faces of the glass between the said driving means, acting to retard the motion of the glass and to impair the uniformity of motion imparted by the driving means, power means to drive the driving means, and power control means connected to the power means and activated by variations in the braking effect of the working tools to vary the driving effort and compensate for the braking effect of the said tools on the glass.

2. In apparatus for continuously manufacturing polished flat glass which comprises a plurality of driving means engaging the glass which tend to impart constant motion thereto, opposed surface working tools, engaging opposite faces of the glass between the said driving means, acting to retard the motion of the glass and to impair the uniformity of motion imparted by the driving means, power means to drive the driving means, and power control means connected to the power means and activated by variations in the speed of the glass to vary the driving effort and compensate for variations in the speed of the glass.

3. In apparatus for continuously manufacturing polished flat glass which comprises a plurality of driving means engaging the glass which tend to impart constant motion thereto, opposed surface working tools, engaging opposite faces of the glass between the said driving means, acting to retard the motion of the glass and to impair the uniformity of motion imparted by the driving means, power means to drive the driving means, and power control means connected to the power means and activated by variations in the speed of the glass and by variations in the energy supplied to the working tools to vary the driving effort and compensate for variations in the braking effect of the tools and the speed of the glass.

4. Apparatus as defined in claim 3 in which the control device assures a small preponderance of the driving force over the braking force.

5. Apparatus as defined in claim 1 comprising an adjustable speed motor drivingly connected to the driving means for the glass of each combination, a tachometer measuring the speed of travel of the glass relative to the tool, and means connecting the tachometer to control the power of the motor whereby automatically to adapt the force exercised by the glass driving means to the braking effort exercised by the associated tool.

6. Apparatus as defined in claim 1, comprising means operatively associated with control means for measuring the energy applied by the tools to the glass, whereby the means for controlling the power is made responsive to the said energy measuring means.

7. Apparatus as defined in claim 3, also comprising an adjustable speed motor drivingly connected to the driving means and to the control means, said control means comprising means measuring the power absorbed by the motor of the tool and varying the power supplied to the driving means in response to fluctuations in power supplied to the tool.

8. Apparatus as defined in claim 1 in which the rollers of the driving device are actuated by a transmission wherein each roller is mechanically driven by a drive train including torque-limiting means.

9. Apparatus according to claim 1 comprising a plurality of combinable working tool and driving means, means to control the driving means of each combination to provide a small but predetermined preponderance of the braking force over the driving force, and speed control driving means downstream of all said combinations to impose a determined and constant speed on the glass.

10. Apparatus according to claim 3 in which two speed control driving means engage the glass band, one being placed immediately at the exit of the annealing lehr and the other immediately upstream of the polishing tools, of which the latter controls the speed of the glass band and the first includes free wheeling means which allows it to be driven by the glass at a speed slightly less than the speed of the latter speed control means, so that in case of rupture of the glass ribbon between the said two speed control means, the edges are made to separate at the break.

11. Apparatus for making polished glass including sheet forming means, sheet cooling means, surface working means which imparts transparency and luster to the sheet and applies braking effect thereto, and sheet advancing means applied to the glass after the surface working means including means to apply added force to the driving means as the braking effect of the surface working means increases.

12. Apparatus for making polished glass comprising means to form a sheet of solid glass, surface working means which imparts transparency and luster and applies braking effect to the glass sheet, sheet advancing means including draft rollers gripping the sheet after the surface working means, and control means operatively associated with the surface working means to increase the power applied to the draft rollers as a function of an increase in braking effect.

13. Apparatus for making polished glass comprising means to form a sheet of solid glass, surface working means which imparts transparency and luster and applies braking effect to the glass sheet, sheet advancing means including draft rollers gripping the sheet after the surface working means, control means operatively associated with the surface working means to increase the power applied to the draft rollers as a function of an increase in braking effect, and control means operatively associated with the surface of the sheet to increase the power applied to the draft rollers as a function of a decrease in the speed of the sheet.

14. Apparatus for making polished glass comprising means to form a sheet of solid glass, surface working means which imparts transparency and luster and applies braking effect to the glass sheet, sheet advancing means including draft rollers gripping the sheet after the surface working means, and control means operatively associated with the surface working means to increase the power applied to the draft rollers as a combined function of the decrease in the speed of the sheet and an increase in the braking effect applied to the sheet by the surface working means.

15. Apparatus for making polished glass including sheet forming means, sheet cooling means, sheet surface working means, and sheet advancing means, said working means including at least one pair of opposed surface working tools applied to opposite sides of the glass and acting to brake the progress of the sheet, and impeller means responsive to variations in the friction between the working means and the sheet applied to the glass adjacent the said working tool pair to compensate for variations in the said braking effect.

16. Apparatus according to claim 14, in which the impeller means include rollers gripping the glass and motor means to drive the rollers which is connected to the rollers by a differential transmission.

17. Apparatus according to claim 13 in which the polishing tools and the impeller means are motor driven and the impeller means comprises speed control means responsive to the speed of the sheet and the power drawn by the polishing tools.

18. Apparatus according to claim 13 in which the driving means for the rollers include free wheeling means in one direction.

19. Apparatus according to claim 4 including braking means upstream of all said driving means acting in combination with said driving means to stabilize the speed of the glass.

References Cited in the file of this patent

UNITED STATES PATENTS

| | | |
|---|---|---|
| 2,270,244 | Baillie et al. | Jan. 20, 1942 |
| 2,270,362 | Waldron et al. | Jan. 20, 1942 |
| 2,673,423 | Hoyet et al. | Mar. 30, 1954 |
| 2,690,034 | Laverdisse | Sept. 28, 1954 |
| 2,848,845 | Dumont | Aug. 26, 1958 |
| 2,972,210 | Broman et al. | Feb. 21, 1961 |
| 3,042,279 | Laverdisse | July 3, 1962 |

FOREIGN PATENTS

| | | |
|---|---|---|
| 452,381 | Great Britain | Aug. 20, 1936 |